United States Patent Office 3,346,096
Patented Oct. 10, 1967

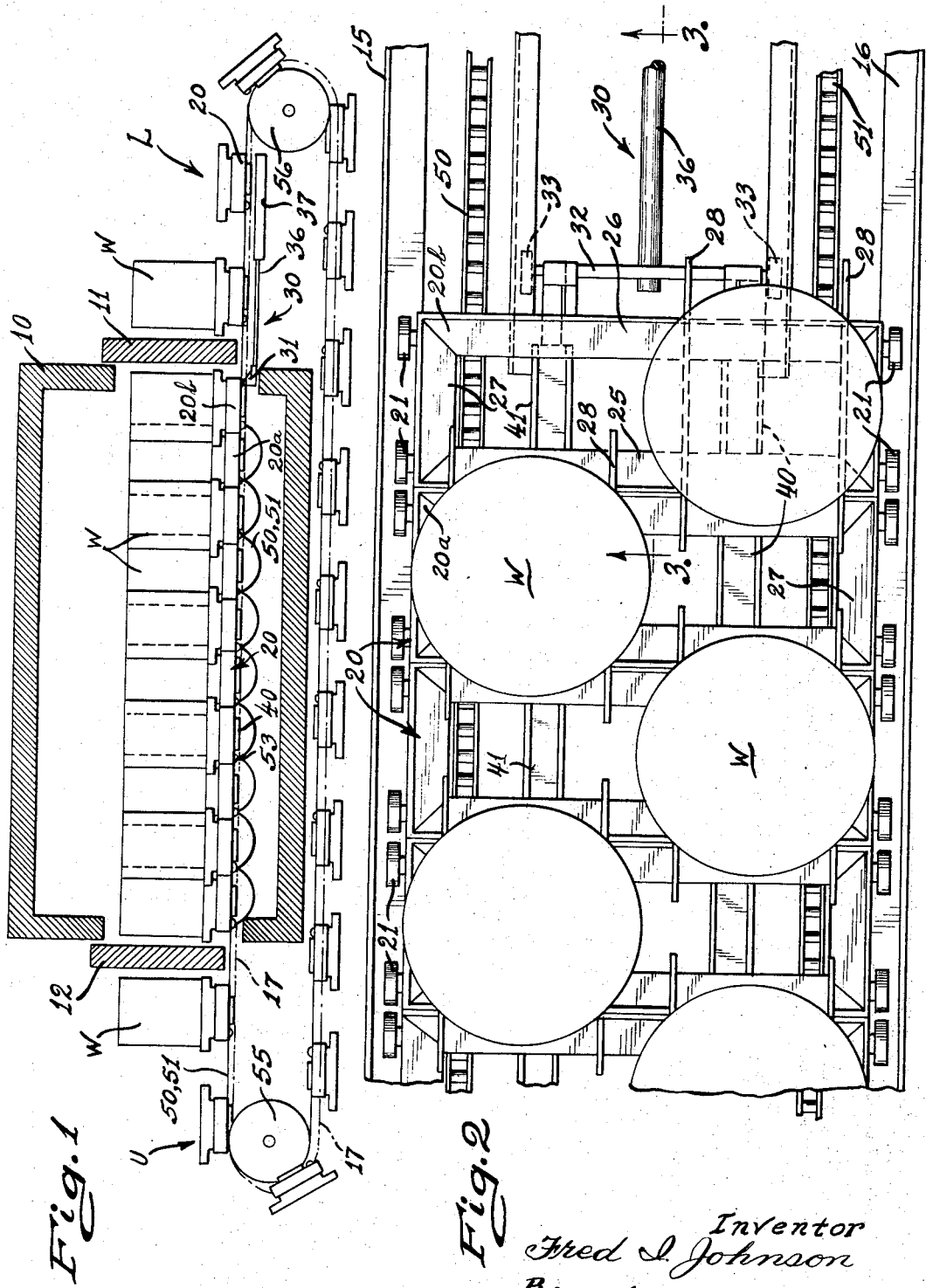

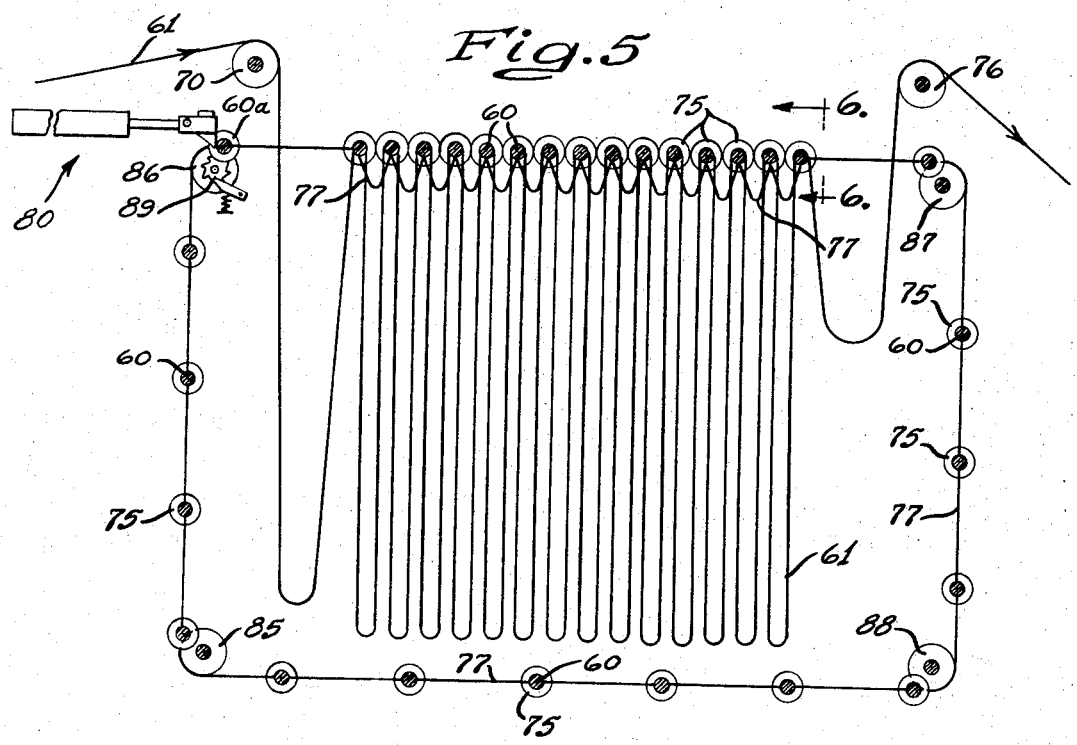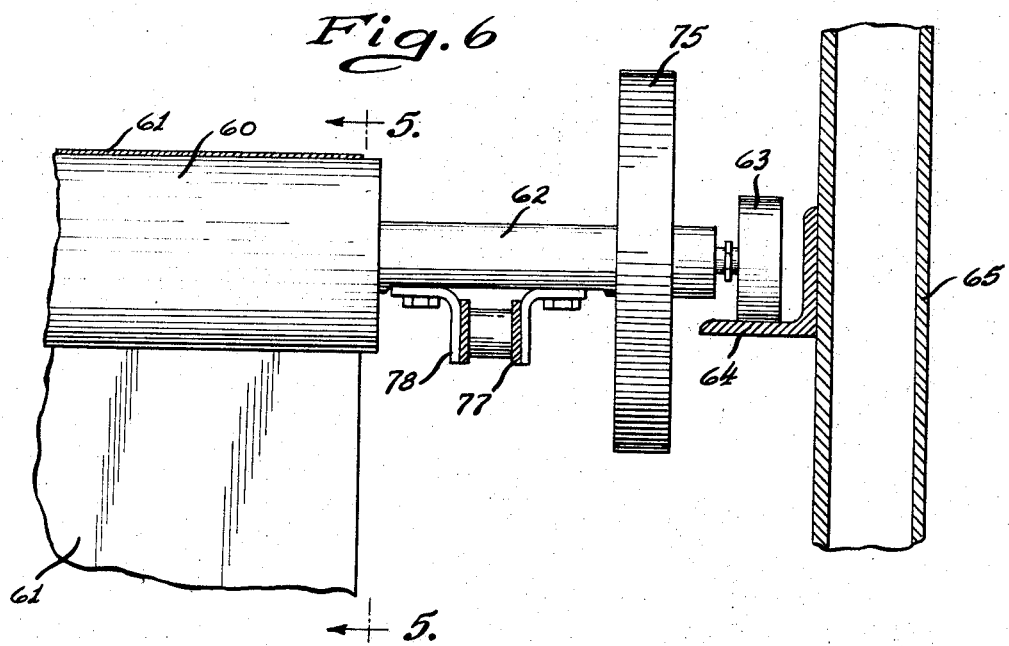

3,346,096
GROUPING CONVEYORS
Fred I. Johnson, 369 Montrose Ave.,
Elmhurst, Ill. 60126
Filed Mar. 23, 1966, Ser. No. 536,832
7 Claims. (Cl. 198—34)

ABSTRACT OF THE DISCLOSURE

A grouping conveyor having a plurality of work supports interengageable through an area where the work supports are to be closely spaced together while movable apart to greater spacing in other areas and with the work supports interconnected by a flexible tension member which only functions to pull work supports when they are spaced apart and is otherwise inoperative.

---

This invention relates to grouping conveyors and, more particularly, to structure for obtaining grouping or close spacing of work inside a treatment or process station, such as a furnace, oven, or washer, or the like.

Many different types of processing equipment provide for conveying of work therethrough and provide for grouping of the workpieces in the processing area by disconnection of the work supports from a continuous conveying mechanism or by highly specialized forms of conveying mechanisms, such as special types of conveying chains. The purpose of this invention is to provide a grouping conveyor mechanism in which the work can be closely spaced in the process area while at all times being part of a conveying system and permitting increased spacing of the work outside the treatment area without any connection or disconnection of the work supports relative to the conveying mechanism.

An object of this invention is to provide a new and improved grouping conveyor mechanism.

Another object of this invention is to provide a grouping conveyor for handling of work in minimum space while maintaining controlled spacing at all times, comprising a plurality of work supports with means thereon for establishing minimum spacing therebetween and engageable, one with the other, for successive advance through a process station, flexible connecting means between adjacent work supports to pull successive work supports along externally of the process station with maximum spacing therebetween as determined by full length extension of the connecting means and with the connecting means going slack between adjacent work supports in the process station to permit the close spacing, and means for advancing successive work supports into the process station.

Another object of the invention is to provide a grouping conveyor mechanism as defined in the preceding paragraph in which said work supports are pallets having wheel means engageable with tracks extending through the process station for support of the pallets and workpieces carried thereby and wherein reciprocating means are provided at the entry end of the process station to successively advance pallets into the station which causes progression of pallets through the station and by a pull exerted through the flexible connecting means causes removal of the furthest advanced pallet from the exit end of the process station.

Still another object of the invention is to provide a grouping conveyor in which the work supports are festoon bars with each bar having spacing means carried thereon for engagement with similar means on an adjacent bar, so that a predetermined minimum spacing can be established between the bars in the process station, with a greater spacing existing externally of the station, as caused by the interconnecting flexible connecting means and means associated with the flexible connecting means to prevent backup and run-out of the flexible connecting means at the entry and exit ends of the process station, respectively.

Further objects and advantages will become apparent from the following detailed description taken in connection wtih the accompanying drawings in which:

FIG. 1 is a fragmentary elevational view of the grouping conveyor of the preferred embodiment shown in association with a process station;

FIG. 2 is a fragmentary plan view of the grouping conveyor structure, on an enlarged scale, and taken looking downwardly at the conveyor structure shown in FIG. 1;

FIG. 5 is a vertical section taken of a second embodiment of the grouping conveyor mechanism, taken generally along line 5—5 in FIG. 6; and FIG. 6 is a vertical section, on an enlarged scale, taken generally along the line 6—6 in FIG. 5.

Figure 3:
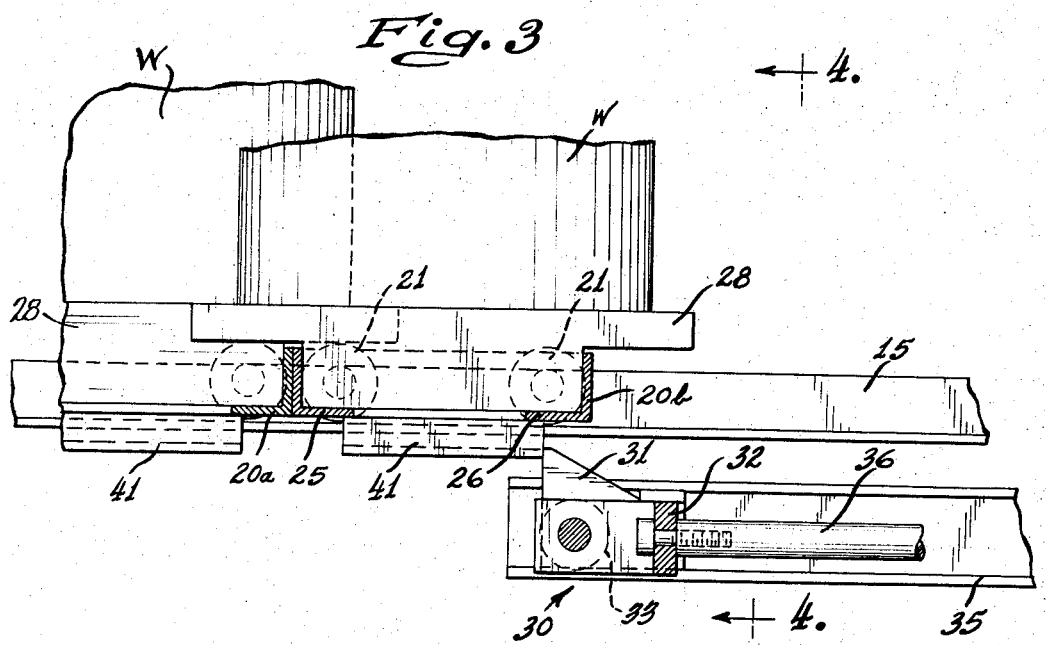
FIG. 3 is a vertical section, on a further enlarged scale, taken generally along the line 3—3 in FIG. 2.

While this invention is susceptible of embodiment in many different forms, there is shown in the drawings and will herein be described in detail an embodiment of the invention together with a modification thereof with the understanding that the present disclosure is to be considered as an exemplification of the principles of the invention and is not intended to limit the invention to the embodiments illustrated. The scope of the invention will be pointed out in the appended claims.

First referring to FIG. 1, the grouping conveyor of the preferred embodiment is shown in association with a process station which, as an example, is illustrated as an oven. The oven has a casing 10 with a movable door 11 at the entrance end and a movable door 12 at the oven exit. A series of workpieces W are positioned within the oven in closely-spaced relation to provide maximum treatment time in minimum space. It will be obvious that upon each cycle of operation the doors 11 and 12 will be opened and a new workpiece W will enter one end of the process station, defined by the oven, and another workpiece will leave at the exit end. A workpiece can be loaded at the position L and unloaded at the position U, as shown in FIG. 1.

The conveyor mechanism comprises spaced-apart track means in the form of angle irons 15 and 16 which define a continuous path having an upper reach running through the process station and a return lower path indicated in broken line at 17. The track means have curved sections at opposite ends where the upper and lower reaches connect.

A series of supporting members in the form of pallets are associated with the track means, with these pallets being indicated generally by the reference numeral 20, and the two pallets immediately within the treating station being further indicated by reference numerals 20a and 20b. Each pallet 20 has a pair of wheels 21 at opposite ends connected rotatably to the pallets by bearings which can be heat resistant when the pallets are associated with an oven which support the pallets on the tracks 15 and 16 as the pallets pass along their endless path. Each pallet is of a simple construction, formed of angle irons connected together with front member 25 and rear member 26 being connected by side members 27. When the work is wider than the pallet, as illustrated in FIGS. 1 to 4, this can be accommodated by staggering the location of the work transversely of each pallet and by supporting the work on raised, laterally offset rest bars 28 which overlie and clear adjacent pallets.

From the foregoing, it will be evident that a pallet 20 arriving at load station L can have a piece of work positioned thereon and that succeeding advances of the pallet will move the pallet first to a position adjacent the door 11 of the treating oven and then into the oven. After a period of time and advances of pallets, the particular pallet will be advanced out of the oven and, at the station U, the workpiece can be removed from the pallet. During the entire time that the pallet is carrying a workpiece, the weight of the pallet and workpiece is carried by the tracks 15 and 16.

Means are provided for advancing a pallet through the entry end of the treatment station comprising a reciprocating pusher, indicated generally at 30, having a pair of pivoted dogs 31 carried by a cross bar 32 having support rollers 33 at opposite ends thereof supported in angle iron tracks 34 and 35. The cross bar 32 is connected to a rod 36 which extends from an actuator in the form of a fluid cylinder 37. The pivoted dogs 31 are in alignment with a pair of depending lugs 40 and 41 secured to the underside of a pallet whereby engagement of the dogs with the lugs and with the rod 36 retracted will result in advance of a pallet 20 as the rod 36 is extended, with the result that a pallet can be moved to the position of pallet 20b, shown in FIGS. 1 and 2, from the position immediately to the right thereof, as viewed in FIG. 1. The advancing mechanism then retracts to a position behind the lugs 40 and 41 of a succeeding pallet as permitted by the one-way pivoting action provided for the dogs 31 whereby they can pivot as they go beneath the lugs on the return stroke of the advancing mechanism. As known to those skilled in the art, the pallet advancing mechanism can include either a hydraulic or pneumatic cylinder or, alternatively, the advancing mechanism can be operated by means of mechanical structure, such as a crank arm drive having a sine motion for smooth starting and stopping.

Figure 4:
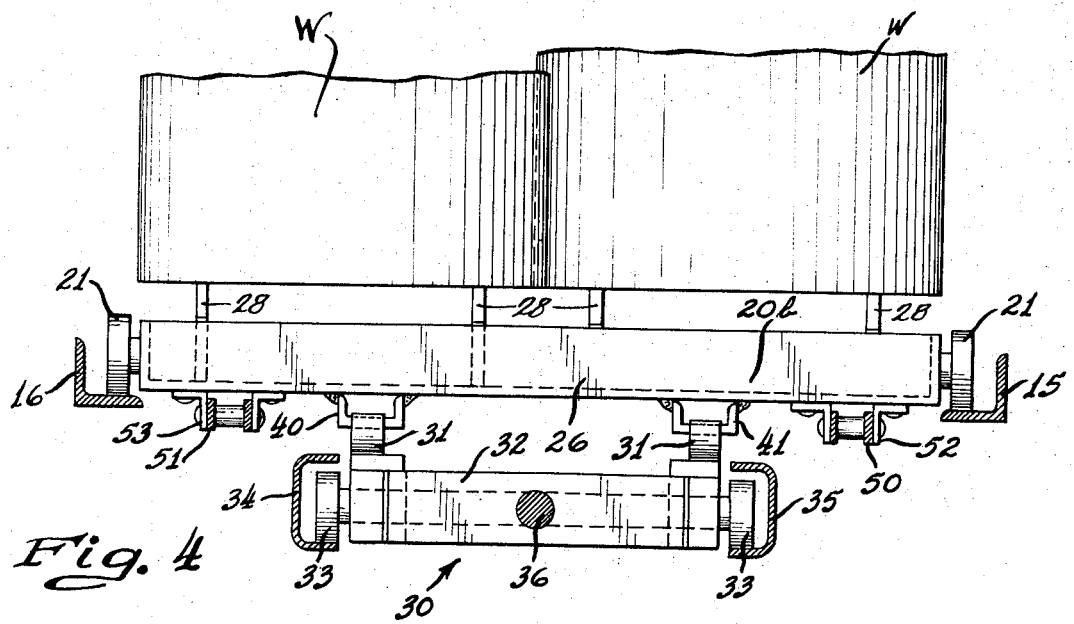
FIG. 4 is a vertical section, taken generally along the line 4—4 in FIG. 3.

The structure described results in simple advance of successive pallets through a process station, with advance of one pallet through contact with an adjacent pallet moving the preceding pallets along. The means causing pallet interengagement is the pallet structure itself by engagement between adjacent front member 25 of one pallet and rear member 26 of a preceding pallet. If greater spacing is desired, separate engaging members could be provided on the pallets. As is evident in FIG. 1, the furthest advanced pallet will not be fully moved out of the treatment station when the door 12 is opened. In order to fully withdraw the last referred to pallet and also carry empty pallets about the endless system back to the loading station L, each pallet is connected to the adjacent pallet by flexible connecting means in the form of laterally-spaced chain sections 50 and 51. These chain sections are connected to the underside of each pallet, adjacent the forward edge thereof, by attaching brackets 52 and 53, respectively, as seen in FIG. 4, with a common point of attachment for each pallet. As seen in FIG. 1, the chain sections 50, 51 between adjacent pallets are permitted to hang slack so that the controlled minimum spacing within the process station is controlled by engagement between successive pallets or means thereon. Outside of the process station, an increased spacing occurs with the maximum spacing being controlled by the length of the chain sections 50, 51. Not only do the chain sections control the maximum spacing, but function to fully withdraw the most advanced pallet from the process station as a result of an advance given to the initial pallet into the process station through the advancing mechanism 30, which is transmitted to the exiting pallet through the chain sections 50, 51 extending around the entire system. Suitable sprockets 55 and 56 are provided at the ends of the conveyor line and where the track reaches interconnect to guide the chains around the turns.

It will be seen from the foregoing that the chain means has no effect on the pallet advance through the treatment station but, due to its being taut externally of the station, provides for spaced advance of the pallets and withdrawal of the exiting pallet from the treatment station. No special functions are required of the chain, so that commercially available chain can be used to interconnect the pallets.

After a workpiece has been removed at unloading station U, the pallets are inverted and return successively to the loading station L, with the pallets still being supported along their return path by means of the lower track reach 17.

Another embodiment of the invention is shown in FIGS. 5 and 6 in which the material supporting members are festoon bars with a bar 60 having a central section on which material, such as cloth or the like, can be supported in draped fashion, with the cloth being indicated at 61. The festoon bar 60 has reduced extensions 62 at each end, each mounting a supporting roller 63, one of which is shown in FIG. 6, for rolling along spaced-apart track means, with the track member 64 shown in association with the roller 63 and being supported by means of a frame support member 65. With the rollers at opposite ends of the festoon bar 60, the weight of the bar and the material supported thereby is taken up by the track means. The material 61 is advanced over a supply roller 70 to festoon into the treatment area and be supported by successive festoon bars 60. A bar 60a, as shown in FIG. 5, will approach the material and have the material draped over it for movement through the station.

The festoon bars have structure associated therewith to provide the same results as in the embodiment disclosed in FIGS. 1 to 4. The festoon bars 60 can be closely-spaced in the treatment area, with the spacing therebetween determined by spacer disks on each extension 62 of the festoon bars, with the disk 75 shown associated with one end thereof in FIG. 6. As shown in FIG. 5, abutment between adjacent spacer disks controls the spacing between the festoon bars and, of course, causes advance of the succeeding bars as the new bar enters the treatment area. As a bar leaves the treatment area a take-off roller 76 causes the material 61 to leave the treatment area and be removed from the last bar in the treatment area.

Means are provided for advancing successive bars along an endless path outside the treatment area, comprising flexible chain means 77 connected to each of the bar extensions 62 at both ends by suitable brackets 78, with the adjacent length of chain being greater than the spacing in the treatment area whereby the chain hangs slack in the treatment area and is taut between bars outside the treatment area. Advance of the bar 60a into the treatment area by an advancing mechanism, indicated generally at 80 and similar to that disclosed in connection with the embodiments of FIGS. 1 to 4, will advance the bars outside the treatment area and withdraw the furthest advanced bar from the treatment area.

At the corners of the endless path for the conveying mechanism, support sprockets 85, 86, 87, and 88 are provided for the chains at each end of the festoon bars for support thereof, with the sprockets 86 having a one-way ratchet 89 to prevent backup of the chains and suitable friction means are associated with the sprockets 87 to hold back the sprockets during rotation and prevent run-out of a bar from the treatment station.

The structure of FIGS. 5 and 6 could readily be used to support other work, such as work supported on cross-bars.

From the foregoing, it will be seen that structures have been disclosed in which advancement of work through a treating or process station can be accomplished entirely independently of a continuous conveying system, with the spacing being determined solely by structure associated with the work supports and with the endless conveying structure being of a simple, flexible chain structure which is, in effect, inoperative through the treatment station but is effective for circulating the work supports about the conveyor line outside of the treatment station.

I claim:
1. A grouping conveyor for handling of material in minimum space while maintaining controlled spacing at all times comprising, a plurality of material supporting members movable along a path with part of said path extending through a process station with minimum spacing between the members and another part of the path being external to said station with maximum spacing between members, spacer means on each of said members engageable with an adjacent one of said spacer means for establishing a minimum spacing between said members in said process station, flexible chain-like connecting means with a section thereof connected between each of said members and each section having a length acting solely in tension to determine the maximum spacing between members and hanging slack to be inoperative when adjacent members are at said minimum spacing, and means for advancing successive members into the entry end of said station with the advanced member pushing preceding members along the station and pulling succeeding members along the path including removal of a member from the exit end of the station by pulling on and tensioning said flexible connecting means.

2. A grouping conveyor as defined in claim 1 wherein said members are pallets, track means extending through said station, and wheels on said pallets engaging said track means for support of the pallet and a load carried thereby in said station whereby said flexible connecting means does not support the load.

3. A grouping conveyor as defined in claim 1 wherein said advancing means includes a reciprocating element engageable with successive members, said element being pivotal in one direction to retract to a position behind a succeeding member prior to advance thereof into said station.

4. A grouping conveyor as defined in claim 3 wherein said reciprocating element is reciprocated by a fluid cylinder, and track means for support of said element during reciprocation thereof.

5. A grouping conveyor as defined in claim 1 wherein said members are festoon bars and said spacing means comprises a spacing disk on each of said bars, track means for support of the bars in said station whereby said flexible chain-like connecting means is free to sag in said station, rotatable supporting members for said connecting means beyond both ends of said station, means associated with the rotatable supporting member ahead of said station to prevent retrograde movement of said rotatable supporting member and said connecting means, and means associated with the rotatable supporting member beyond said station to hold back the rotatable supporting member and said connecting means and prevent run-out of festoon bars in said station.

6. A grouping conveyor for handling of workpieces to have two different spacings including a close spacing in a treatment station, means at said treatment station for treating said workpieces, a plurality of pallets each provided with means for individual support of a workpiece, track means extending through said station, rotatable means on said pallets and engageable with said track means for supporting the pallets and workpieces in said treatment station, means at the entry end of said treatment station for successively advancing pallets into said station with each advanced pallet engaging a preceding pallet in the station to move the pallets along through the station at close spacing, and collapsible connecting means between successive pallets having a maximum length to pull pallets along an endless path outside said station at a maximum spacing while permitting the close spacing in said station.

7. A grouping conveyor as defined in claim 6 in which each pallet has an offset workpiece support whereby workpieces can be staggered on successive pallets.

References Cited

UNITED STATES PATENTS

| | | | |
|---|---|---|---|
| 20,965 | 7/1858 | Vandeventer | 198—116 X |
| 1,557,368 | 10/1925 | Kershaw et al. | 198—110 X |
| 2,534,054 | 12/1950 | Parkes | 198—110 X |
| 3,292,769 | 12/1966 | Zuppiger | 198—110 |

EDWARD A. SROKA, *Primary Examiner.*

EVON C. BLUNK, *Examiner.*

A. C. HODGSON, *Assistant Examiner.*